United States Patent
Fujii (10) Patent No.: US 8,606,201 B2
(45) Date of Patent: Dec. 10, 2013

(54) MOBILE COMMUNICATION TERMINAL, AND METHOD AND PROGRAM FOR SWITCHING TRANSMISSION POWER

(75) Inventor: Katsushige Fujii, Dalto (JP)

(73) Assignee: Kyocera Corporation, Kyoto (JP)

(*) Notice: Subject to any disclaimer, the term of this patent is extended or adjusted under 35 U.S.C. 154(b) by 124 days.

(21) Appl. No.: 12/675,765

(22) PCT Filed: Aug. 27, 2008

(86) PCT No.: PCT/JP2008/065256
§ 371 (c)(1),
(2), (4) Date: Jul. 9, 2010

(87) PCT Pub. No.: WO2009/028529
PCT Pub. Date: Mar. 5, 2009

(65) Prior Publication Data
US 2010/0297967 A1 Nov. 25, 2010

(30) Foreign Application Priority Data
Aug. 31, 2007 (JP) .................. 2007-227172

(51) Int. Cl.
*H01Q 11/12* (2006.01)
*H04B 1/04* (2006.01)

(52) U.S. Cl.
USPC ..................................... 455/127.1; 455/550.1

(58) Field of Classification Search
USPC ................. 455/127.1, 127.5, 550.1, 572, 574
See application file for complete search history.

(56) References Cited

U.S. PATENT DOCUMENTS

| | | | |
|---|---|---|---|
| 6,256,520 B1 * | 7/2001 | Suzuki | 455/572 |
| 7,031,673 B1 | 4/2006 | Maeda | |
| 7,454,227 B2 | 11/2008 | Kitaji | |
| 7,589,519 B2 | 9/2009 | Park | |
| 2005/0064903 A1 * | 3/2005 | Uotsu et al. | 455/556.1 |
| 2006/0094458 A1 * | 5/2006 | Kitaji | 455/522 |
| 2007/0185382 A1 * | 8/2007 | Shimizu et al. | 600/118 |
| 2009/0040027 A1 * | 2/2009 | Nakao | 340/10.5 |

FOREIGN PATENT DOCUMENTS

| | | |
|---|---|---|
| JP | 9-8721 | 1/1997 |
| JP | 09-046264 | 2/1997 |
| JP | 11-163756 | 6/1999 |
| JP | 2005-86939 | 3/2005 |
| JP | 2006-186967 | 7/2006 |

(Continued)

OTHER PUBLICATIONS

Office Action from Japanese Patent Application No. 2007-227172, mailed on May 24, 2011.
International Search Report for PCT/JP2008/065256, mailed on Nov. 4, 2008, 1 page.

(Continued)

*Primary Examiner* — Nhan Le
(74) *Attorney, Agent, or Firm* — Duane Morris LLP (57) ABSTRACT

In order to transmit radio waves even when an external device is connected, a mobile phone includes an antenna; an FM transmitter which outputs signals for transmitting radio waves from the antenna; an earphone terminal 17, a USB terminal 18, and a charging terminal to each of which an external device may be connected; and a connection detecting portion which detects whether an external device is connected to any of the earphone terminal, the USB terminal, and the charging terminal. The FM transmitter controls transmission power of the radio waves (S05, S06) in accordance with a status of connection with an external device (YES or NO in S02) which is detected by the connection detecting portion.

9 Claims, 6 Drawing Sheets

(56) References Cited

FOREIGN PATENT DOCUMENTS

| | | |
|---|---|---|
| JP | 2007-96986 | 4/2007 |
| JP | 2007-192564 | 8/2007 |
| KR | 10-2006-0018649 | 3/2006 |
| KR | 10-2006-0052270 | 5/2006 |
| WO | WO-02/29986 | 4/2002 |

OTHER PUBLICATIONS

Notice of Argument Submission (translation) for KR 2010-7006953, mailed Sep. 29, 2011, 6 pages.

Notice of Ground of Rejection (translation) for JP 227172/2007, mailed Aug. 16, 2011, 3 pages.

* cited by examiner

|  | EARPHONE TERMINAL | USB TERMINAL | CHARGING TERMINAL | TRANSMISSION POWER |
|---|---|---|---|---|
| CONNECTION STATUS 1 | × | × | × | P1 |
| CONNECTION STATUS 2 | ○ | × | × | P2 |
| CONNECTION STATUS 3 | ○ | ○ | × | P3 |
| CONNECTION STATUS 4 | ○ | × | ○ | P4 |
| CONNECTION STATUS 5 | × | ○ | × | P5 |
| CONNECTION STATUS 6 | × | ○ | ○ | P6 |
| CONNECTION STATUS 7 | × | × | ○ | P7 |
| CONNECTION STATUS 8 | ○ | ○ | ○ | P8 |

| CONNECTION TERMINAL | EARPHONE TERMINAL | | USB TERMINAL | | CHARGING TERMINAL | TRANSMISSION POWER |
|---|---|---|---|---|---|---|
| TYPE | EARPHONE | EARPHONE MICROPHONE | PC | BATTERY CHARGER | | |
| CONNECTION STATUS 1 | × | × | × | × | × | P1 |
| CONNECTION STATUS 2-1 | ○ | × | × | × | × | P2-1 |
| CONNECTION STATUS 2-2 | × | ○ | × | × | × | P2-2 |
| CONNECTION STATUS 3-1 | ○ | × | ○ | × | × | P3-1 |
| CONNECTION STATUS 3-2 | × | ○ | ○ | × | × | P3-2 |
| CONNECTION STATUS 3-3 | ○ | × | × | ○ | × | P3-3 |
| CONNECTION STATUS 3-4 | × | ○ | × | ○ | × | P3-4 |
| CONNECTION STATUS 4-1 | ○ | × | × | × | ○ | P4-1 |
| CONNECTION STATUS 4-2 | × | ○ | × | × | ○ | P4-2 |
| CONNECTION STATUS 5 | × | × | ○ | × | × | P5-1 |
| CONNECTION STATUS 5 | × | × | × | ○ | × | P5-2 |
| CONNECTION STATUS 6 | × | × | ○ | × | ○ | P6-1 |
| CONNECTION STATUS 6 | × | × | × | ○ | ○ | P6-2 |
| CONNECTION STATUS 7 | × | × | × | × | ○ | P7 |
| CONNECTION STATUS 8-1 | ○ | × | ○ | × | ○ | P8-1 |
| CONNECTION STATUS 8-2 | × | ○ | ○ | × | ○ | P8-2 |
| CONNECTION STATUS 8-3 | ○ | × | × | ○ | ○ | P8-3 |
| CONNECTION STATUS 8-4 | × | ○ | × | ○ | ○ | P8-4 |

FIG. 8

MOBILE COMMUNICATION TERMINAL, AND METHOD AND PROGRAM FOR SWITCHING TRANSMISSION POWER

CROSS-REFERENCE TO RELATED APPLICATIONS

This is a U.S. National Phase Application of International Application No. PCT/JP2008/065256 filed Aug. 27, 2008, which claims priority to Japanese Patent Application No. 2007-227172 filed Aug. 31, 2009, the disclosures of which are incorporated herein by reference in their entirety.

TECHNICAL FIELD

The present invention relates to a mobile communication terminal, and a method and a program for switching transmission power. More specifically, the present invention relates to a mobile communication terminal provided with a transmitter which transmits a signal from an antenna, and a method and a transmission power switching program embodied on a computer readable medium which are carried out in the mobile communication terminal.

BACKGROUND ART

There has recently appeared a mobile phone provided with an FM transmitter which transmits FM radio waves from an antenna. When music data stored in the mobile phone is reproduced and the resultant signals are transmitted from the FM transmitter on FM radio waves via the antenna, a radio receiver can receive the signals for audio output.

On the other hand, the mobile phone is provided with a connection terminal for connecting to an earphone, a connection terminal for connecting to a USB device such as a personal computer, and a connection terminal for connecting to a battery charger, whereby the mobile phone is connected with an external device such as an earphone, a USB device, or a battery charger. When the mobile phone is connected with an external device, however, antenna gain of the antenna to which the FM transmitter is connected changes, which may cause the field intensity of the FM radio waves transmitted from the FM transmitter to exceed a predetermined value. The FM transmitter has conventionally been configured not to transmit FM radio waves while an external device is connected to the mobile phone.

This however poses a problem that a user cannot talk using an earphone, communicate with a personal computer, or charge a battery while replaying music using the radio receiver.

DISCLOSURE OF THE INVENTION

Problems to be Solved by the Invention

The present invention has been accomplished to solve the above-described problems, and an object of the present invention is to provide a mobile communication terminal which is capable of transmitting radio waves even when an external device is connected thereto.

Another object of the present invention is to provide a method and a transmission power switching program embodied on a computer readable medium which enable transmission of radio waves even when an external device is connected to the mobile communication terminal.

Means for Solving the Problems

To achieve the above-described objects, according to an aspect of the present invention, a mobile communication terminal includes: an antenna; transmitting portion to transmit radio waves from the antenna; a connecting portion to which an external device may be connected; and a detecting portion to detect that an external device is connected to the connecting portion; wherein the transmitting portion controls transmission power of the radio waves in accordance with a connection status of the external device detected by the detecting portion.

According to another aspect of the present invention, a method for switching transmission power is carried out by a mobile communication terminal, the mobile communication terminal including an antenna, a transmitting portion to transmit radio waves from the antenna, and a connecting portion to which an external device may be connected, wherein the method includes the steps of: detecting that an external device is connected to the connecting portion; and controlling transmission power of the radio waves transmitted by the transmitting portion in accordance with a connection status of the external device.

According to a further aspect of the present invention, a transmission power switching program embodied on a computer readable medium; the program is carried out by a mobile communication terminal, the mobile communication terminal including an antenna, a transmitting portion to transmit radio waves from the antenna, and a connecting portion to which an external device may be connected, wherein the program causes the mobile communication terminal to perform the steps of: detecting that an external device is connected to the connecting portion; and controlling transmission power of the radio waves transmitted by the transmitting portion in accordance with a connection status of the external device.

DESCRIPTION OF REFERENCE CHARACTERS

1: mobile phone; 2: display side portion; 3: operation side portion; 11: first speaker; 12: second speaker; 13: microphone; 14: operation keys; 14A: power key; 17: earphone terminal; 18: USB terminal; 19: charging terminal; 21: control portion; 22: radio circuit; 22A: antenna; 23: transmitter; 23A: antenna; 24: camera; 26: vibration portion; 27A: flash memory; 28: codec portion; 29: switching portion; 30: display control portion; 51: power control portion; 53: connection detecting portion; 27: card I/F; and 15A: small LCD.

BEST MODES FOR CARRYING OUT THE INVENTION

Embodiments of the present invention will now be described with reference to the drawings. In the following description, like reference characters denote like parts, which have like names and functions, and therefore, detailed description thereof will not be repeated.

Figure 1A:
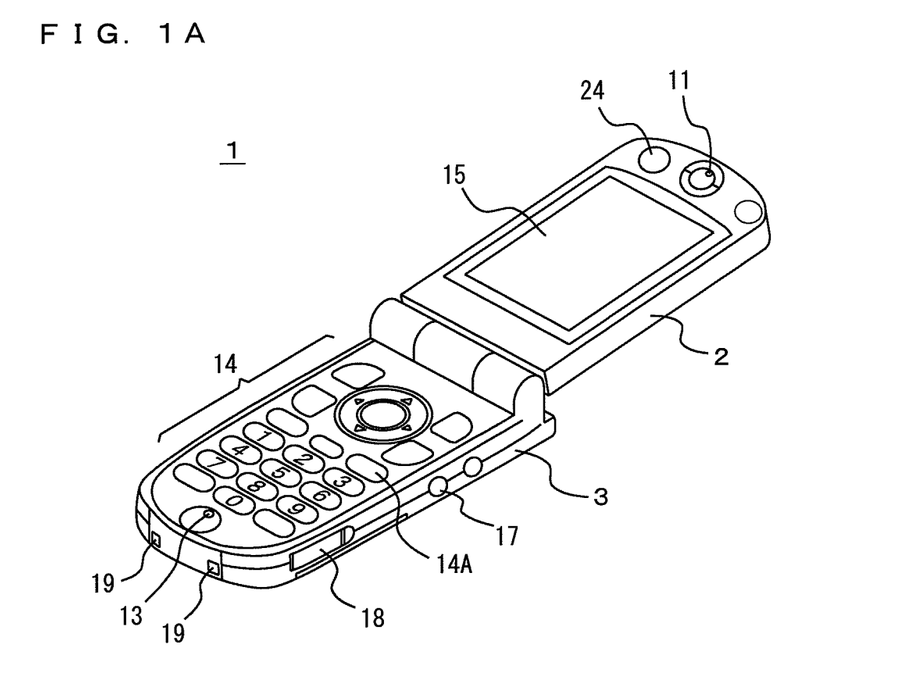
FIG. 1 shows perspective views of a mobile phone according to an embodiment of the present invention.
Figure 1B:
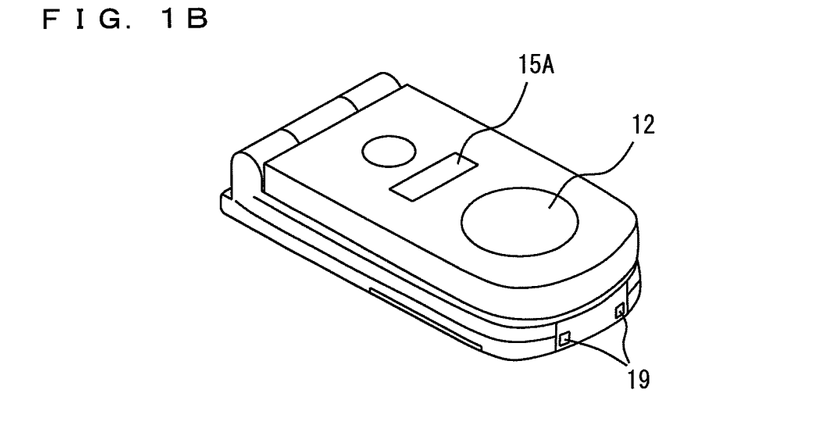

FIG. 1 shows perspective views of a mobile phone according to an embodiment of the present invention. FIG. 1(A) shows a perspective view of a mobile phone 1 in the state of an open style, while FIG. 1(B) shows a perspective view of mobile phone 1 in the state of a closed style. Referring to FIGS. 1(A) and 1(B), mobile phone 1 includes an operation side portion 3 and a display side portion 2. Operation side portion 3 and display side portion 2 are rotatably connected via a hinge mechanism to be freely opened and closed. The state where mobile phone 1 is folded and operation side portion 3 and display side portion 2 are in the closed position corresponds to the closed style, while the state where mobile phone 1 is open and operation side portion 3 and display side portion 2 are in the open position corresponds to the open style.

Operation side portion 3 has operation keys 14 including a power key 14A, ten keys, and a talk key, and a microphone 13 arranged on its inner surface, an earphone terminal 17 and a USB terminal 18 arranged on its right side, and two charging terminals 19 arranged on its bottom side.

Display side portion 2 has a liquid crystal display (LCD) 15, a first speaker 11 constituting a receiver, and a camera 24 arranged on its inner surface, and a small LCD 15A and a second speaker 12 arranged on its outer surface. Although mobile phone 1 has LCD 15 in this example, LCD 15 may be replaced with an organic electro-luminescence (EL) display.

To an earphone terminal 17, an earphone is connected as an external device. To a universal serial bus (USB) terminal 18, a USB device such as a personal computer or a battery charger is connected as an external device. The earphone connected to earphone terminal 17 includes an earphone microphone. In the state where mobile phone 1 is placed on a battery charger, two charging terminals 19 come into contact respectively with two terminals included in the battery charger, to receive power supplied from the battery charger into mobile phone 1. It is noted that charging terminals 19 may be those of the type into which a connector of a battery charger is inserted.

Figure 2:
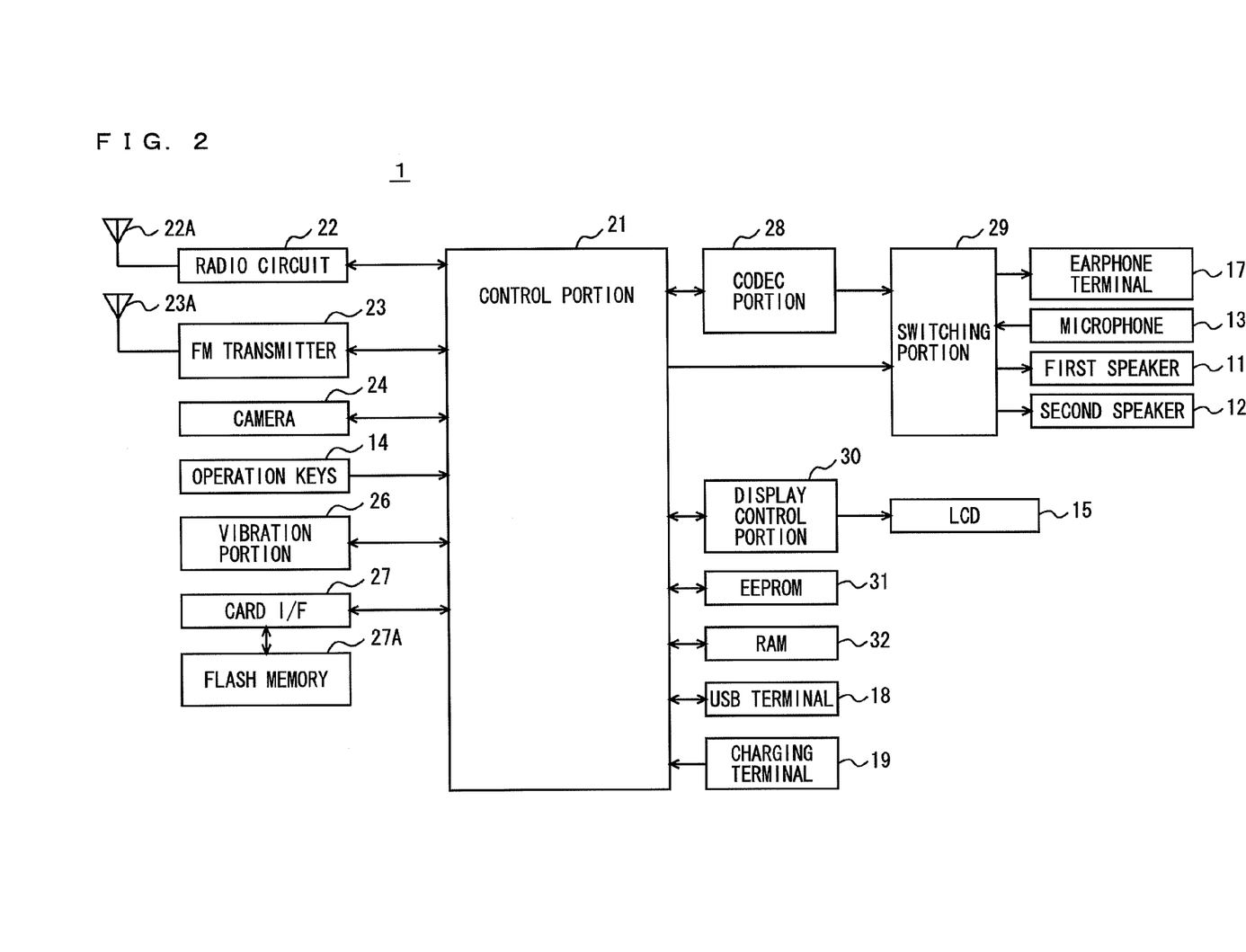
FIG. 2 is a functional block diagram showing an example of the functions of the mobile phone according to the embodiment.

FIG. 2 is a functional block diagram showing an example of the functions of the mobile phone of the present embodiment. Referring to FIG. 2, mobile phone 1 includes: a control portion 21 responsible for overall control of mobile phone 1; a radio circuit 22 connected to an antenna 22A; an FM transmitter 23 connected to an antenna 23A; a coder-decoder (codec) portion 28 for processing audio data; a switching portion 29 for switching input/output of codec portion 28; microphone 13, first speaker 11, second speaker 12, and earphone terminal 17 each connected to switching portion 29; camera 24; operation keys 14 for accepting an input of user's operation; a vibration portion 26; a display control portion 30 for controlling display on LCD 15; an electronically erasable and programmable ROM (EEPROM) 31 for storing, among others, a program to be executed by control portion 21; a random access memory (RAM) 32 used as a work area for control portion 21; USB terminal 18; and charging terminal 19.

Radio circuit 22 receives a radio signal received by antenna 22A, and outputs an audio signal obtained by demodulating the radio signal to codec portion 28. Further, radio circuit 22 receives an audio signal from codec portion 28, and outputs a radio signal obtained by modulating the audio signal to antenna 22A.

Coder-decoder portion 28 decodes an audio signal input from radio circuit 22, converts the decoded digital audio signal to an analog signal, and amplifies the signal to output it to switching portion 29. Further, codec portion 28 receives an analog audio signal from microphone 13 via switching portion 29, converts the audio signal to a digital signal, encodes it, and outputs the encoded audio signal to radio circuit 22.

FM transmitter 23 is controlled by control portion 21. FM transmitter 23 modulates an analog audio signal, which is obtained when control portion 21 reproduces audio data stored in EEPROM 31, and transmits from antenna 23A radio waves based on the modulated radio signal. Here, FM transmitter 23 transmits FM radio waves from antenna 23A. It is noted that the radio waves transmitted are not necessarily FM radio waves; they may be AM radio waves. FM transmitter 23 has an amplifier, which enables a transmission power for transmitting radio waves to be changed. FM transmitter 23 transmits radio waves from antenna 23A using the transmission power designated by control portion 21.

Switching portion 29, which is controlled by control portion 21, switches input/output of the audio signal with respect to codec portion 28. Switching portion 29 accepts an audio signal from codec portion 28, and outputs it to any one of earphone terminal 17, first speaker 11, and second speaker 12. In the case where an earphone is connected to earphone terminal 17, it outputs the audio signal accepted from codec portion 28 to earphone terminal 17. In the case where the earphone is not connected to earphone terminal 17, it outputs the audio signal accepted from codec portion 28 to second speaker 12 if mobile phone 1 is in a hands-free mode, while it outputs the audio signal accepted from codec portion 28 to first speaker 11 if mobile phone 1 is not in the hands-free mode. Mobile phone 1 is set to the hands-free mode in response to the user's operation of operation keys 14. Even if mobile phone 1 is not set to the hands-free mode in the state where a call is made in the open style, once mobile phone 1 is changed to the closed style, control portion 21 sets mobile phone 1 to the hands-free mode. Accordingly, while switching portion 29 outputs the audio signal accepted from codec portion 28 to first speaker 11 if mobile phone 1 is not set to the hands-free mode while a call is made in the open style, switching portion 29 outputs the audio signal accepted from codec portion 28 to second speaker 12 once the state of mobile phone 1 is changed to the closed style.

Switching portion 29 outputs the audio signal output from microphone 13 to codec portion 28. In the case where an earphone microphone is connected to the earphone terminal, switching portion 29 outputs the audio signal accepted from earphone terminal 17 to codec portion 28, while it outputs the audio signal accepted from microphone 13 to codec portion 28 when the earphone microphone is not connected to earphone terminal 17.

Display control portion 30, which is controlled by control portion 21, controls LCD 15 in accordance with an instruction input from control portion 21, to cause LCD 15 to display an image. The image displayed on LCD 15 includes a moving image and a still image.

A removable flash memory 27A is mounted to a card I/F 27. Control portion 21 is capable of accessing flash memory 27A via card I/F 27. While it is here assumed that the program to be executed by control portion 21 is stored in ROM 31, the program may be stored in flash memory 27A and read therefrom to be executed by control portion 21. The recording medium for storing the program is not restricted to flash memory 27A. It may be a flexible disk, a cassette tape, an optical disk (compact disc-ROM (CD-ROM), magnetic optical disc (MO), mini disc (MD), digital versatile disc (DVD)), an IC card (including a memory card), an optical card, or a semiconductor memory such as a mask ROM, an EPROM, an EEPROM, or the like. Still alternatively, mobile phone 1 may be connected to the Internet via radio circuit 22 and the program may be downloaded from a computer connected to the Internet, to be executed by control portion 21. As used herein, the "program" includes, not only the program directly executable by control portion 21, but also a program in the form of a source program, a compressed program, an encrypted program, and others.

Camera 24 is provided with a lens and a photoelectric conversion element such as a complementary metal oxide semiconductor (CMOS) sensor. The lens collects light and focuses it onto the CMOS sensor, which in turn performs photoelectric conversion of the received light to output image data to control portion 21.

Figure 3:
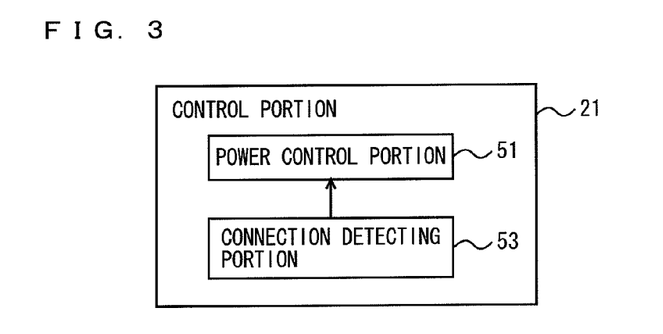
FIG. 3 is a functional block diagram showing an example of the functions of a control portion included in the mobile phone.

FIG. 3 is a functional block diagram showing an example of the functions of the control portion included in the mobile phone. Referring to FIG. 3, control portion 21 includes a power control portion 51 for controlling the transmission power for FM transmitter 23 and a connection detecting portion 53 for detecting a connection of an external device.

Connection detecting portion 53 detects each connection of an earphone, a USB cable, and a battery charger. Specially, connection detecting portion 53 detects a connection of an earphone when the earphone is connected to earphone terminal 17. A change in voltage at a predetermined connection terminal included in earphone terminal 17 may be detected, or earphone terminal 17 may be configured to have a switch for detecting a connection of the earphone. Further, connection detecting portion 53 detects a connection of a USB cable when the USB cable is connected to USB terminal 18. A change in voltage at a predetermined connection terminal included in USB terminal 18 may be detected, or USB terminal 18 may be configured to have a switch for detecting a connection of the USB cable. Furthermore, connection detecting portion 53 detects a connection of a battery charger when detecting a predetermined voltage applied across the two charging terminals 19.

When connection detecting portion 53 detects any of connections of the earphone, the USB cable, and the battery charger, connection detecting portion 53 outputs to power control portion 51 a connect signal indicating which one of earphone terminal 17, USB terminal 18, and charging terminal 19 is connected with the external device. Connection detecting portion 53 outputs a connect signal including identification information for earphone terminal 17 when an earphone is connected, outputs a connect signal including identification information for USB terminal 18 when a USB device is connected, and outputs a connect signal including identification information for charging terminal 19 when a battery charger is connected. When connection detecting portion 53 detects none of connections with them, connection detecting portion 53 outputs to power control portion 51 a connect signal indicating that none of the earphone, the USB cable, and the battery charger is connected.

Power control portion 51 controls the transmission power of FM transmitter 23 on the basis of a connect signal received from connection detecting portion 53.

Figure 4:
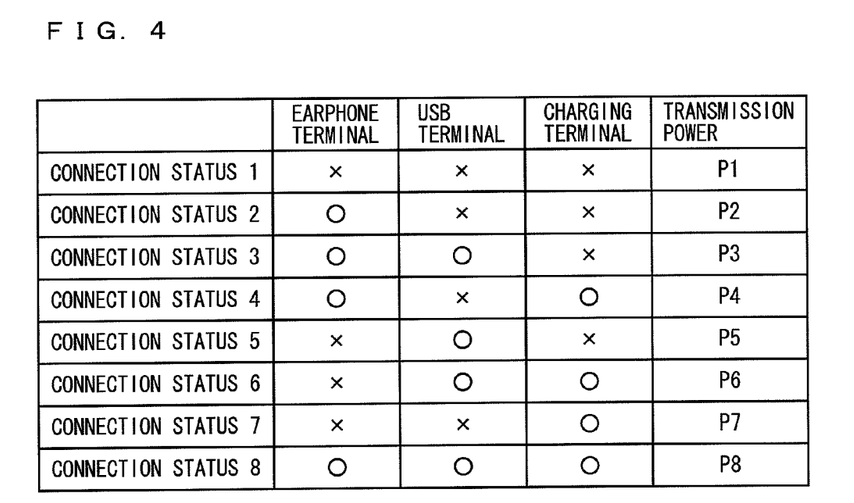
FIG. 4 is a diagram showing an example of a power table.

FIG. 4 is a diagram showing an example of a power table. Referring to FIG. 4, the power table defines a transmission power for each one of a plurality of connection statuses. Hereinafter, the earphone, the USB cable, and the battery charger are collectively referred to as external devices. Each of the connection statuses is determined in accordance with a combination of any of earphone terminal 17, USB terminal 18, and charging terminal 19 to which the corresponding external device is connected. That is, in the power table, a transmission power is associated with each one of a plurality of combinations each containing at least one of the connection terminals (earphone terminal 17, USB terminal 18, and charging terminal 19) to which the corresponding external device is connected. More specifically, in FIG. 4, "earphone terminal" is the identification information for earphone terminal 17, "USB terminal" is the identification information for USB terminal 18, and "charging terminal" is the identification information for charging terminal 19. In FIG. 4, "O" indicates the state where an external device is connected, and "X" indicates the state where no external device is connected. For example, a connection status 1 indicates that no earphone is connected to earphone terminal 17, no USB cable is connected to USB terminal 18, and no battery charger is connected to charging terminal 19, and a transmission power P1 is associated with the connection status 1. A connection status 2 indicates that an earphone is connected to earphone terminal 17, no USB cable is connected to USB terminal 18, and no battery charger is connected to charging terminal 19, and a transmission power P2 is associated with the connection status 2.

The transmission power is determined on the basis of a maximum antenna gain of antenna 23A in the case where an external device is connected, in the plurality of connection statuses. While the antenna gain of antenna 23A varies depending on the type of the external device connected, the types of external devices which can be connected to each of earphone terminal 17, USB terminal 18, and charging terminal 19 are restricted. If the type of the external device is determined, the maximum antenna gain of antenna 23A corresponding to that type of the external device is determined. Thus, for example, among the plurality of types of external devices which can be connected to earphone terminal 17, the external device which causes the antenna gain of antenna 23A to reach a maximum value when it is connected to mobile phone 1 is determined, and as a result, the maximum value of the antenna gain of antenna 23A in the case where the relevant external device is connected to mobile phone 1 is determined. The transmission power is determined, for each of the plurality of connection statuses, to be a value which causes the field intensity of FM radio waves transmitted from antenna 23A to be equal to or less than a predetermined value, on the basis of the maximum antenna gain of antenna 23A in the case where the corresponding one or more external devices are connected.

Returning to FIG. 3, power control portion 51 detects a connection status on the basis of any of earphone terminal 17, USB terminal 18, and charging terminal 19 to which the corresponding external device is connected. Power control portion 51 then searches the power table to extract the transmission power associated with the detected connection status. Specifically, power control portion 51 refers to the power table stored in advance in EEPROM 31, to extract a record in which "O" is set in the field corresponding to the identification information for earphone terminal 17, USB terminal 18, or charging terminal 19 that is included in the connect signal, and "X" is set in the field corresponding to the identification information that is not included in the connect signal. Power control portion 51 determines the transmission power included in that record as the transmission power for FM transmitter 23. FM transmitter 23 is then controlled to transmit the radio waves using the determined transmission power.

Figure 5:
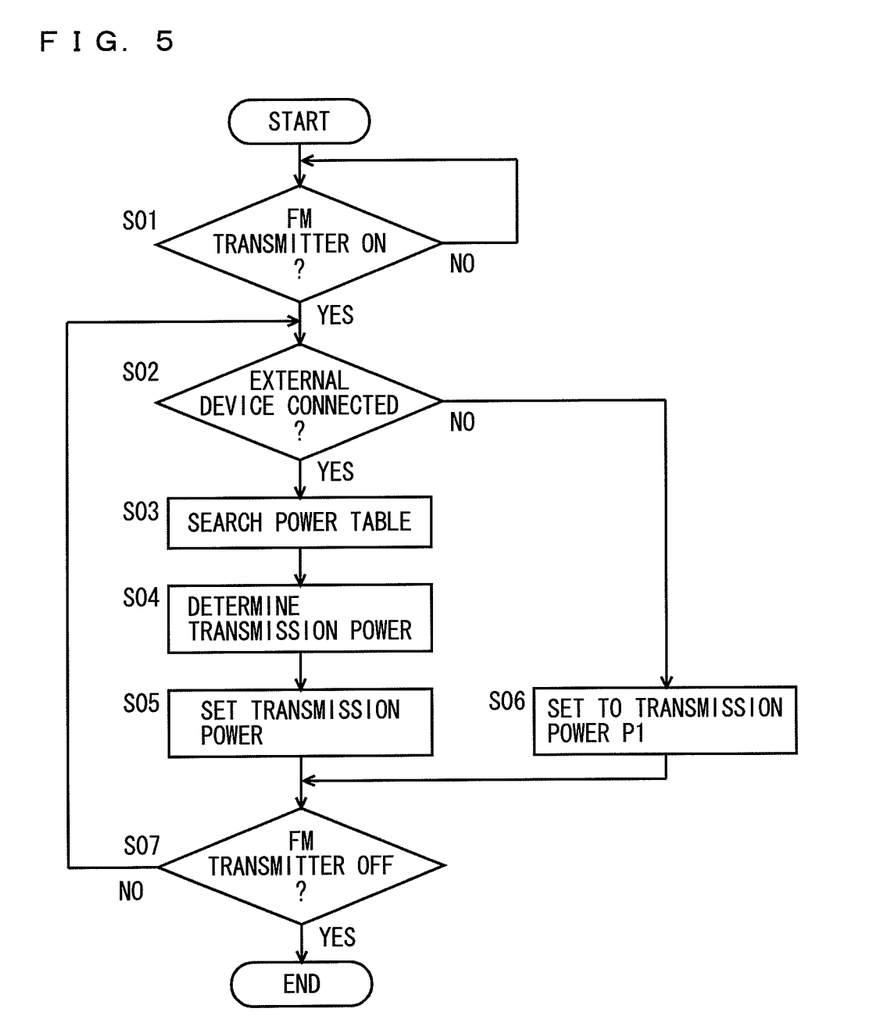
FIG. 5 is a flowchart illustrating an example of the flow of processing for switching transmission power.

FIG. 5 is a flowchart illustrating an example of the flow of processing for switching transmission power. The processing for switching transmission power is executed by control portion 21 as control portion 21 executes a program for switching transmission power stored in EEPROM 31.

Referring to FIG. 5, control portion 21 determines whether FM transmitter 23 is turned on. When a user inputs to operation keys 14 an operation for starting FM transmitter 23, control portion 21 accepts the operation from operation keys 14. When accepting the operation from operation keys 14, control portion 21 determines that FM transmitter 23 is turned on, and it starts FM transmitter 23. Control portion 21 is in a standby mode until FM transmitter 23 is turned on (NO in step S01), and once FM transmitter 23 is turned on, the process proceeds to step S02. That is, the processing for switching transmission power is executed provided that the operation for turning on FM transmitter 23 is accepted.

In step S02, it is determined whether an external device is connected. Specifically, it is determined whether any one of the connections of an earphone, a USB cable, and a battery charger is detected. If it is detected that an external device is connected, the process proceeds to step S03; otherwise, the process proceeds to step S06.

In step S06, a predetermined transmission power P1 is set as the transmission power for FM transmitter 23, and the process proceeds to step S07. Specifically, FM transmitter 23 is controlled to output a signal using the predetermined transmission power P1.

On the other hand, in step S03, the power table is searched. Specifically, the power table stored in EEPROM 31 is searched to determine a record corresponding to the connection status that is determined on the basis of any of earphone terminal 17, USB terminal 18, and charging terminal 19 for which connection has been detected in step S02.

The transmission power included in the determined record is determined (step S04). Then, the determined transmission power is set as the transmission power for FM transmitter 23 (step S05). Specifically, FM transmitter 23 is controlled to output a signal using the determined transmission power.

In the following step S07, it is determined whether FM transmitter 23 is turned off. When accepting an operation for turning off FM transmitter 23 from operation keys 14, control portion 21 determines that FM transmitter 23 is turned off, and it stops FM transmitter 23. If it is determined that FM transmitter 23 is turned off, the process is terminated; otherwise, the process returns to step S02.

Figure 6:
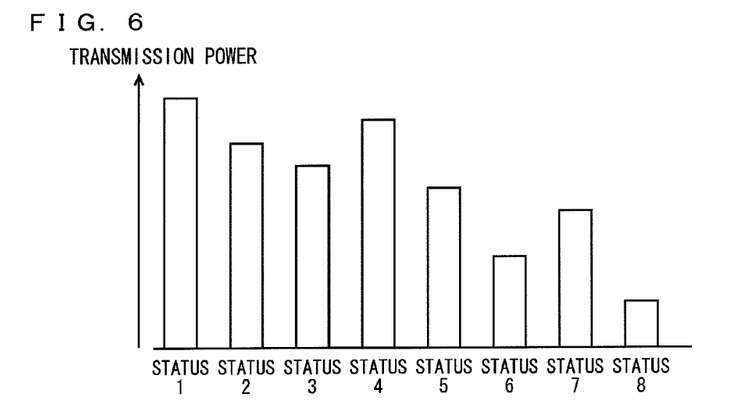
FIG. 6 is a diagram showing a relationship between a connection status and a transmission power.

FIG. 6 is a diagram showing a relationship between a connection status and a transmission power. Referring to FIG. 6, transmission power P1 for connection status 1 is highest, and transmission power P8 for connection status 8 is lowest. This is because the more external devices are connected to mobile phone 1, the higher antenna gain of antenna 23A is.

As described above, although antenna gain of antenna 23A changes when one or more external devices are connected to any of earphone terminal 17, USB terminal 18, and charging terminal 19, mobile phone 1 according to the present embodiment causes the transmission power to be varied in accordance with the connection statuses with respect to the external devices. In one example, the transmission power in the case where a connection of an external device to one of earphone terminal 17, USB terminal 18, and charging terminal 19 is detected is varied from the transmission power in the case where no connection of an external device to any of them is detected. This enables the field intensity of radio waves transmitted not to exceed a predetermined value.

Further, the power table is stored in which a transmission power is associated with each one of a plurality of connection statuses each containing at least one of a plurality of connection terminals, or earphone terminal 17, USB terminal 18, and charging terminal 19. The radio waves are transmitted from FM transmitter 23 using the transmission power that is associated in the power table with the connection status that is determined by the combination of the connection terminals among earphone terminal 17, USB terminal 18, and charging terminal 19 for which a connection of the corresponding external device has been detected. This allows the transmission power to be varied for each of the combinations of earphone terminal 17, USB terminal 18, and charging terminal 19 to which the corresponding external devices are connected.

Each transmission power shown in the power table is determined on the basis of the maximum antenna gain of antenna 23A in the case where a predetermined external device is connected to the corresponding one of earphone terminal 17, USB terminal 18, and charging terminal 19. This ensures that the field intensity of radio waves transmitted is equal to or less than a predetermined value.

<Modification>

Mobile phone 1 according to a modification is configured to detect the types of the external devices connected to earphone terminal 17 and USB terminal 18, and to cause FM transmitter 23 to output a signal using a transmission power predetermined in correspondence with the type of the external device connected.

When connection detecting portion 53 shown in FIG. 3 detects that an external device is connected to earphone terminal 17, it detects whether the external device connected is an earphone or an earphone microphone. For example, the connected device may be determined to be the earphone or the earphone microphone on the basis of a change in voltage at a predetermined connection terminal included in earphone terminal 17. Alternatively, it may be determined to be the earphone microphone when an input of voice is detected, and to be the earphone when no input of voice is detected. When connection detecting portion 53 detects that an external device is connected to USB terminal 18, it detects whether the external device connected is a personal computer (PC) or a battery charger. For example, the connected device may be determined to be the PC or the battery charger on the basis of a value of voltage at a predetermined connection terminal included in USB terminal 18.

When detecting any of connections of the earphone, the USB cable, and the battery charger, connection detecting portion 53 outputs a connect signal to power control portion 51. The connect signal indicates which one(s) of earphone terminal 17, USB terminal 18, and charging terminal 19 is/are connected with one or more external devices, and further includes type specification information for specifying the type(s) of the external device(s) connected. In the case where an earphone or an earphone microphone is connected, the connect signal includes the identification information for earphone terminal 17 and the type specification information for specifying the one of earphone and earphone microphone that is connected. In the case where a USB device is connected, the connect signal includes the identification information for USB terminal 18 and the type specification information for specifying the one of PC and battery charger that is connected. In the case where a battery charger is connected to charging terminal 19, the connect signal includes the identification information for charging terminal 19 and the type specification information for specifying the battery charger.

Power control portion 51 controls the transmission power for FM transmitter 23 on the basis of the connect signal received from connection detecting portion 53.

Figure 7:
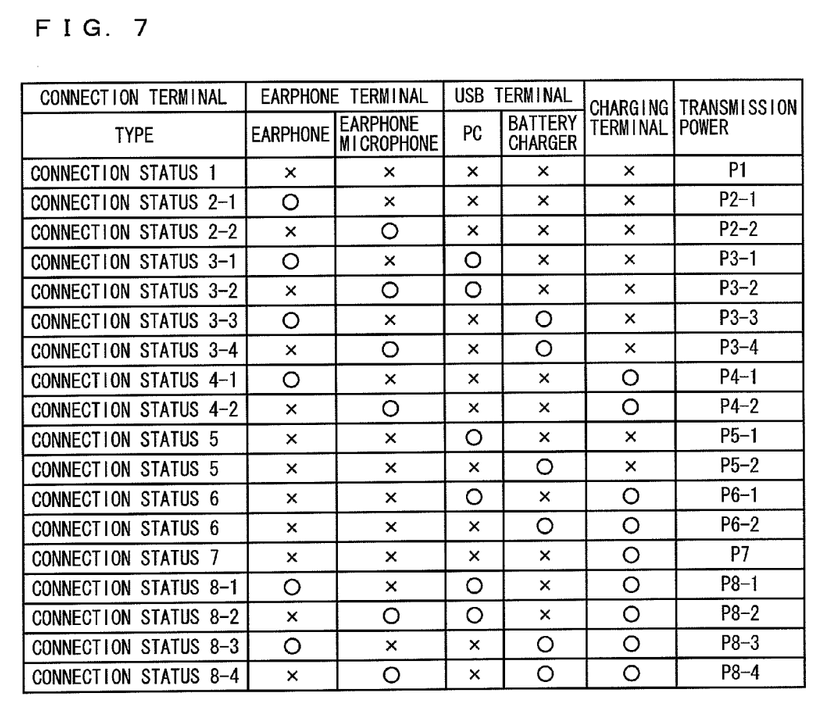
FIG. 7 is a diagram showing an example of the power table according to a modification.

FIG. 7 is a diagram showing an example of the power table according to the modification. Referring to FIG. 7, the power table in the modification is different from the power table shown in FIG. 4 in that the fields of earphone terminal 17, USB terminal 18, and charging terminal 19 are further divided according to the types of the external devices. Therefore, the number of connection statuses is increased as compared with that in the power table shown in FIG. 4, because the connection status is determined by a combination of the types of the external devices. Specifically, the "earphone terminal" field is divided into two fields of "earphone" and "earphone microphone", where "earphone" is the type specification information for the earphone and "earphone microphone" is the type specification information for the earphone microphone. The "USB terminal" field is divided into two fields of "PC" and "battery charger", where "PC" is the type specification information for the PC and "battery charger" is the type specification information for the battery charger. Thus, in the power table according to the modification, a transmission power is associated with each one of a plurality of combinations each containing at least one of a plurality of types of external devices.

For example, a connection status 2-1 indicates the state where an earphone is connected to earphone terminal 17 and no external device is connected to USB terminal 18 and charging terminal 19, and a transmission power P2-1 is associated with the connection status 2-1. Further, a connection status 2-2 indicates the state where an earphone microphone is connected to earphone terminal 17 and no external device is connected to USB terminal 18 and charging terminal 19, and a transmission power P2-2 is associated with the connection status 2-1.

The transmission power is determined on the basis of the maximum antenna gain of antenna 23A in the case where one or more external devices are connected, in the plurality of connection statuses. The transmission power is determined, for each of the plurality of connection statuses, to be a value which causes the field intensity of FM radio waves transmitted from antenna 23A to be equal to or less than a predetermined value, on the basis of the maximum antenna gain of antenna 23A in the case where the corresponding one or more external devices are connected.

Returning to FIG. 3, in the case where there is an external device connected to any of earphone terminal 17, USB terminal 18, and charging terminal 19, power control portion 51 detects a connection status on the basis of the type of the external device connected. Specifically, power control portion 51 refers to the power table stored in advance in EEPROM 31, to extract a record in which "O" is set in the field corresponding to the identification information for earphone terminal 17, USB terminal 18, or charging terminal 19 and the type specification information that are included in the connect signal, and "X" is set in the field corresponding to the identification information and the type specification information that are not included in the connect signal. Power control portion 51 determines the transmission power included in that record as the transmission power for FM transmitter 23. FM transmitter 23 is then controlled to transmit the radio waves using the determined transmission power.

Figure 8:
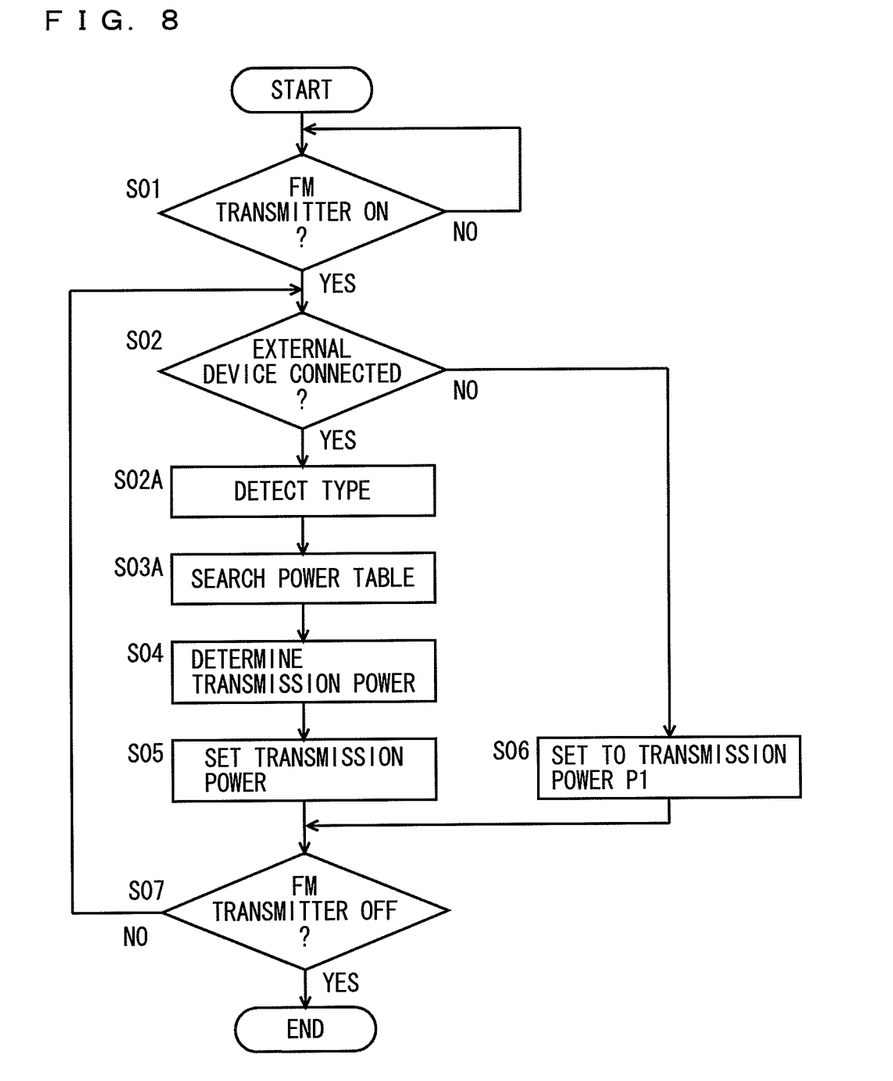
FIG. 8 is a flowchart illustrating an example of the flow of the processing for switching transmission power according to the modification.

FIG. 8 is a flowchart illustrating an example of the flow of the processing for switching transmission power according to the modification. Referring to FIG. 8, the processing for switching transmission power in the modification is different from the processing for switching transmission power shown in FIG. 5 in that step S02A is added after step S02, and step S03 is modified to step S03A. The other processing is identical to the processing shown in FIG. 5, and thus, description thereof will not be repeated here.

In step S02A, the type of the external device for which connection has been detected in step S02 is detected. In the case where the connection has been detected at two or more of earphone terminal 17, USB terminal 18, and charging terminal 19, the types of all the external devices connected to any of earphone terminal 17, USB terminal 18, and charging terminal 19 are detected. Specifically, in the case where it is detected that an external device is connected to earphone terminal 17, it is detected whether the external device connected is an earphone or an earphone microphone. In the case where it is detected that an external device is connected to USB terminal 18, it is detected whether the external device detected is a PC or a battery charger.

In the following step S03A, the power table stored in EEPROM 31, as shown in FIG. 7, is searched to determine a record corresponding to the connection status that is determined on the basis of the identification information for any of earphone terminal 17, USB terminal 18, and charging terminal 19 for which connection has been detected in step S02 and the type specification information for specifying the external device detected in step S02A.

As described above, mobile phone 1 according to the modification stores the power table in which a transmission power is associated with each one of a plurality of connection statuses each containing at least one of an earphone and an earphone microphone which can be connected to earphone terminal 17, a PC and a battery charger which can be connected to USB terminal 18, and a battery charger which can be connected to charging terminal 19. Further, a signal is output using the transmission power which is associated with the connection status that is determined by the combination of at least one type of external device, among the earphone, earphone microphone, PC, and battery charger, for which connection has been detected. This enables the transmission power to be varied in accordance with the combination of the connection terminals to which any of the earphone, earphone microphone, PC, and battery charger is connected.

Each of the plurality of combinations each containing at least one of the earphone, earphone microphone, PC, and battery charger is associated with a transmission power which is determined on the basis of the maximum antenna gain of antenna 23A in the case where the at least one of the earphone, earphone microphone, PC, and battery charger is connected. This ensures that the field intensity of radio waves transmitted is equal to or less than a predetermined value.

While mobile phone 1 has been described as an example of the mobile communication terminal in the above embodiment, the mobile communication terminal is not limited to the mobile phone, but may be any electronic device such as a transmitter, as long as the device is provided with FM transmitter 23. The present invention may of course be understood as a transmission power switching method for carrying out the processing shown in FIG. 5 or 8, or as a transmission power switching program for causing a computer to carry out the transmission power switching method.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

<Appendix>

(1) The mobile communication terminal according to claim 1, wherein said connecting portion includes a plurality of connection terminals to which a plurality of external devices may be connected, the mobile communication terminal further comprising:

a transmission power storing portion to store transmission powers in association with a plurality of connection statuses; and a connection status detecting portion to detect which one of said plurality of connection statuses has been established, on the basis of a combination of any communication terminals among said plurality of communication terminals for which connection with the corresponding external device has been detected by said detecting portion; wherein said transmitting portion transmits the radio waves from said antenna using the transmission power that is stored in association with the connection status detected by said connection status detecting portion.

(2) The mobile communication terminal according to claim 1, wherein said connecting portion includes a plurality of connection terminals to which a plurality of types of external devices may be connected, the mobile communication terminal further comprising:

a type detecting portion to detect, for each of said plurality of connection terminals, a type of the external device connected to the connection terminal;

a transmission power storing portion to store transmission powers in association with a plurality of connection statuses; and a connection status detecting portion to detect which one of said plurality of connection statuses has been established, on the basis of a combination of any types of the external devices among said plurality of types of external devices for which connection has been detected by said type detecting portion; wherein said transmitting portion transmits the radio waves from said antenna using the transmission power that is stored in association with the connection status detected by said connection status detecting portion.

(3) The mobile communication terminal according to any of claims 1 to 3 and 5, wherein each of said transmission powers stored in said transmission power storing portion is determined on the basis of a maximum antenna gain of said antenna in the corresponding one of said plurality of connection statuses.

The invention claimed is:

1. A mobile communication terminal, comprising:
an antenna;
a transmitting portion to transmit radio waves from said antenna;
a connecting portion to which an external device may be connected; and
a detecting portion to detect that an external device is connected to said connecting portion; wherein
said transmitting portion adjusts transmission power of the radio waves, without stopping transmission of said radio waves, to one of a plurality of predetermined transmission power levels, in accordance with a connection status of the external device detected by said detecting-portion.

2. The mobile communication terminal according to claim 1, wherein said transmitting portion causes the transmission power for transmitting the radio waves from said antenna to be varied between the case where a connection of the external device is detected by said detecting portion and the case where no connection of the external device is detected by said detecting portion.

3. The mobile communication terminal according to claim 1, wherein said connecting portion includes a plurality of connection terminals to which external devices may be connected,
the mobile communication terminal further comprising:
a connection status detecting portion to detect a status of connection of at least one of said plurality of connection terminals with the corresponding external device; and
a transmission power storing portion to store transmission powers in association with the statuses of connection with the external devices; wherein
said transmitting portion transmits the radio waves from said antenna on the basis of the transmission power that is stored in said transmission power storing portion in association with the status of connection detected by said connection status detecting portion.

4. The mobile communication terminal according to claim 1, wherein said connecting portion includes a connection terminal to which a plurality of types of external devices may be connected,
the mobile communication terminal further comprising:
a type detecting portion to detect a type of the external device connected to said connection terminal; and
a transmission power storing portion to store transmission powers in association with the types of the external devices; wherein
said transmitting portion transmits the radio waves from said antenna on the basis of the transmission power that is stored in said transmission power storing portion in association with the type of the external device detected by said type detecting portion.

5. The mobile communication terminal according to claim 1, wherein said connecting portion includes a plurality of connection terminals to which a plurality of types of external devices may be connected,
the mobile communication terminal further comprising:
a connection status detecting portion to detect a status of connection of at least one of said plurality of connection terminals with the corresponding external device;
a type detecting portion to detect the type of the external device connected to said connection terminal; and
a transmission power storing portion to store transmission powers in association with the statuses of connection with the external devices and the types of the external devices; wherein
said transmitting portion transmits the radio waves from said antenna on the basis of the transmission power that is stored in said transmission power storing portion in association with the status of connection detected by said connection status detecting portion and the status of connection detected by said type detecting portion.

6. The mobile communication terminal according to claim 1, wherein each transmission power stored in said transmission power storing portion is determined on the basis of a maximum antenna gain of said antenna.

7. The mobile communication terminal according to claim 1, wherein said transmitting portion transmits the radio waves from said antenna using a predetermined transmission power in the case where no connection with an external device is detected by said detecting portion.

8. A method for switching transmission power executed in a mobile communication terminal,
the mobile communication terminal including
an antenna,
a transmitting portion to transmit radio waves from said antenna, and
a connecting portion to which an external device may be connected, the method comprising the steps of:

detecting that an external device is connected to said connecting portion; and adjusting transmission power of the radio waves transmitted by said transmitting portion, without stopping transmission of said radio waves, to one of a plurality of predetermined transmission power levels, in accordance with a connection status of the external device.

9. A transmission power switching program embodied on a computer readable medium; the program being executed in a mobile communication terminal, the mobile communication terminal including an antenna, a transmitting portion to transmit radio waves from said antenna, and a connecting portion to which an external device may be connected, the program causing said mobile communication terminal to perform the steps of:

detecting that an external device is connected to said connecting portion; and adjusting transmission power of the radio waves transmitted by said transmitting portion, without stopping transmission of said radio waves, to one of a plurality of predetermined transmission power levels, in accordance with a connection status of the external device.

* * * * *